(No Model.)

J. W. STROUSE.
APPARATUS FOR TRUING THE PERIPHERY OF CIRCULAR SAWS.

No. 422,323. Patented Feb. 25, 1890.

Witnesses.
Carroll J. Webster.
Anna J. Delaney.

Inventor.
James W. Strouse
By William Webster
Attorney.

UNITED STATES PATENT OFFICE.

JAMES W. STROUSE, OF FOSTORIA, OHIO.

APPARATUS FOR TRUING THE PERIPHERY OF CIRCULAR SAWS.

SPECIFICATION forming part of Letters Patent No. 422,323, dated February 25, 1890.

Application filed July 1, 1889. Serial No. 316,133. (No model.)

*To all whom it may concern:*

Be it known that I, JAMES W. STROUSE, a citizen of the United States, and a resident of Fostoria, in the county of Seneca and State of Ohio, have invented certain new and useful Improvements in Apparatus for Truing the Periphery of Circular Saws; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an apparatus for truing the periphery of circular saws, and has for its object to utilize the revolution of the saw in grinding the periphery to a true circle.

A further object is to provide an apparatus that can be easily attached to the saw-frame with an adjustment of the grinding-wheel that will allow of contact of the same with the periphery of the saw to reduce the same to a true circle.

The invention consists in gearing a friction-wheel with a grinding-wheel in a manner to cause the revolution of the saw to impart motion to the revoluble grinding-wheel journaled so as to be adjusted to contact with the peripheral teeth of a circular saw when the side of the revolving saw is in contact with the friction-wheel.

Figure 1:
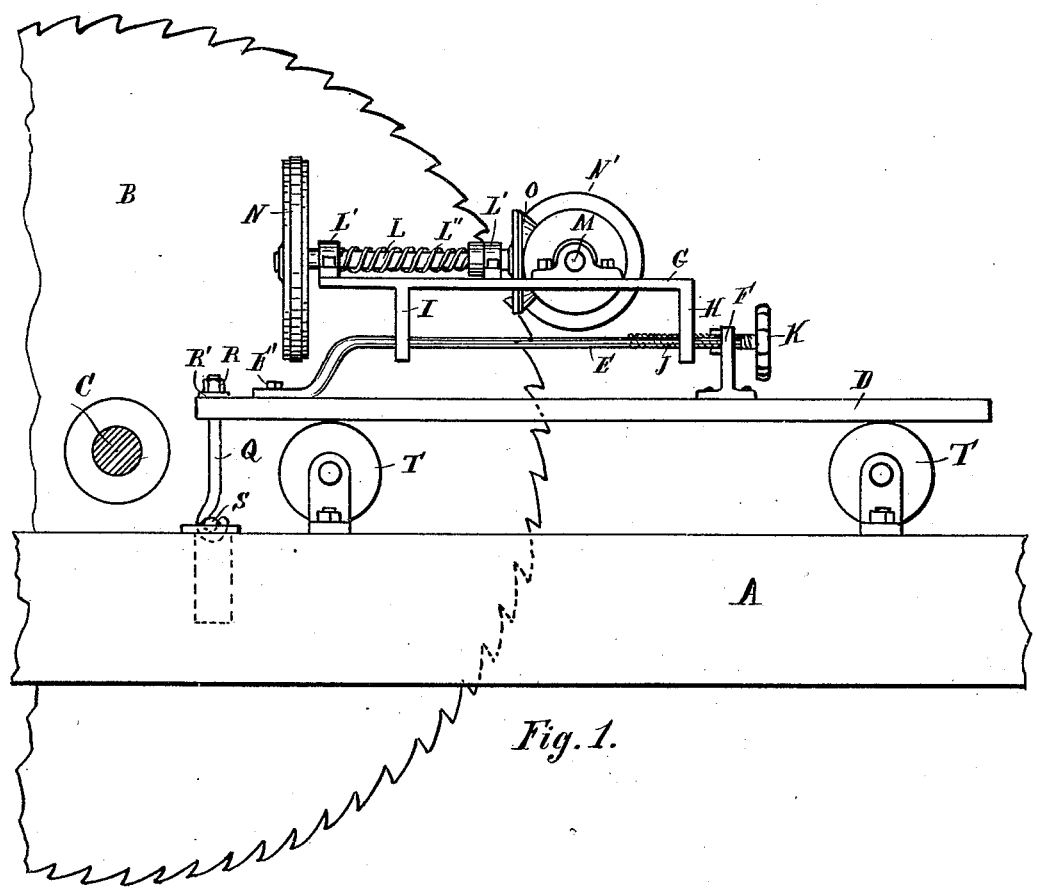
Figure 2:
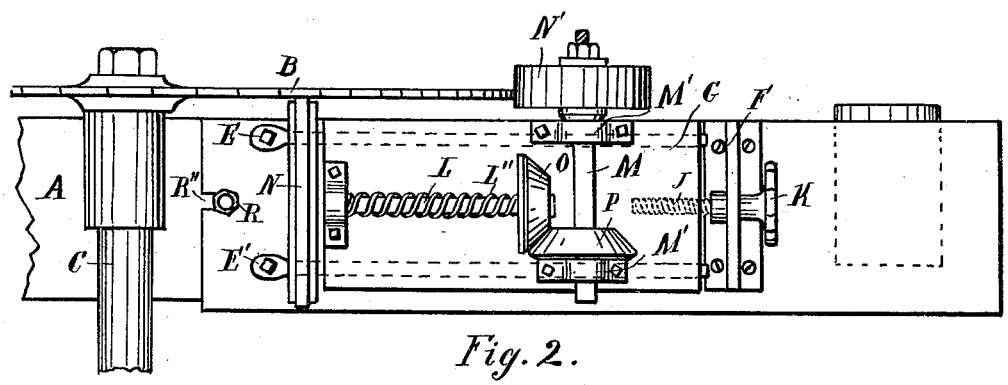

In the drawings, Figure 1 is a side elevation of a portion of a circular saw and the frame thereof with my apparatus attached thereto in position to operate to reduce the periphery of the saw to a true circle. Fig. 2 is a plan view of the same, showing the friction-wheel in contact with the side of the saw and a preferred means of transmitting motion to a grinding-wheel journaled at right angles thereto.

In the branch of the art to which my invention belongs it has been necessary heretofore when the saw has become worn out of a true circle to stop the saw and true the same by means of swaging or filing. This operation is not only tedious and expensive, but requires the services of a skilled mechanic.

The object of my invention is to render it convenient to reduce the peripheral toothed portion of the saw to a true circle without stopping the same by an apparatus that can be manipulated in the hands of an ordinary workman, and the work performed in a more perfect manner and in a shorter space of time.

A designates the saw-frame, and B the saw, secured upon arbor C in the usual manner.

D designates a base-board to my apparatus, upon which are secured metal guides E, attached at one end to the board by bolts or screws, from which point the guides incline upwardly a short distance, and from thence horizontally, and are secured to the forward end of the board.

G designates a table mounted upon guides E in a manner to be moved horizontally thereon, said table being formed with an end portion H at right angles to the table and a corresponding angled portion I near the opposite end. Each of the angled portions is formed with perforations, through which the guides E pass, by which means the table is held firmly upon the guide. The end H of the table has also a screw-threaded perforation, through which a screw-threaded adjusting-rod J, journaled in the standard F, is passed, rod J being turned by means of a small wheel K upon the free end thereof.

Upon table G is mounted a shaft L, journaled in boxes L', secured to the table, and also a shaft M, journaled in boxes M' at right angles to shaft L.

N designates a friction-wheel secured upon the outer end of shaft L and adapted to be caused to revolve by frictional contact with the side of the saw. To the opposite end of shaft L is secured a bevel friction gear-wheel O, which intermeshes with a like bevel friction-wheel P upon shaft M, by which means motion is communicated to said shaft and to the grinding-wheel N' upon the free end of shaft M, said wheel N' being immediately in front of the saw B.

In operation the base-board is secured at the forward end to the saw-frame by means of a detachable connection. For the purposes of illustration I have shown a hook Q, having a screw-threaded end, upon which is run a nut R and washer R', the hook Q being seated into a slot R'' in the base-board, upon which the washer bears with any desired pressure by reason of the tension given by nut R, the opposite end of the hook being engaged with a cross-iron S, secured to the saw-frame. The body of the board rests upon the rollers T upon the saw-frame, and the rear end is held in position by the operator, who moves the base-board laterally upon the rollers to cause the friction-wheel to engage frictionally with the saw, with the effect of causing the wheel and shaft L to revolve, and with the same the shaft M and grinding-wheel N'. The operator turns wheel K and the adjusting-rod J, causing the table to move upon guides E, thereby moving the grinding-wheel to a proper position to remove the projecting portions of the saw that render the same out of a true circle. Should the eccentricity of the saw cause too great pressure upon the grinding-wheel, a spring L'' upon shaft L, arranged to normally cause gears O and P to engage, will yield and allow wheel P to slip upon wheel O, thereby obviating any danger of breakage.

It will be seen that the apparatus is inexpensive of construction, efficient in operation, and by its portability can be quickly adjusted to the different saws within the mill, and, further, that by reason of the fixed adjustment of the grinding-wheel relatively to the saw a true circle is always assured. It will also be apparent that I may vary the details of the construction of the table and adjustment thereof without departing from the spirit of my invention.

What I claim is—

1. An apparatus for grinding the periphery of circular saws to a true circle, comprising a saw, a friction-wheel revolved by the circular movement of the saw, a grinding-wheel in engagement with the periphery of the saw, and intermediate gearing from the friction-wheel to the grinding-wheel to revolve the same, all combined as and for the purpose set forth.

2. In combination with a circular saw, a movable table, a friction-wheel journaled upon the same with the periphery in engagement with the side of the saw, a grinding-wheel in engagement with the periphery of the saw, and gearing from the friction-wheel to the grinding-wheel to cause a revolution of the same, as and for the purpose set forth.

3. In combination with a circular saw, a friction-wheel journaled at right angles thereto, a shaft in parallel alignment with the saw, and a shaft at right angles to the latter shaft and geared therewith, having a grinding-wheel adapted to be moved into engagement with the periphery of the saw, as and for the purpose set forth.

4. In combination with a circular saw, a movable table provided with shafts journaled at right angles, and gearing to cause the shafts to move in unison, one of the shafts being provided with a wheel revolved by direct contact with the saw, the shaft at right angles having a grinding-wheel adapted to move with the table to contact with the periphery of the saw, as and for the purpose set forth.

5. In combination with a circular saw and the frame thereof, a base-board removably secured thereto, a table movable relatively to the base-board, a shaft journaled upon the table, provided with a friction-wheel upon one end in contact with the saw, and a bevel-gear upon the opposite end, in combination with a shaft journaled at right angles to the saw and provided with a bevel-gear in engagement with the bevel-gear upon the shaft at right angles thereto, and a grinding-wheel adapted to be moved into engagement with the periphery of the saw, as and for the purpose set forth.

6. In an apparatus for grinding the periphery of circular saws to a true circle, a saw, a driving-wheel in engagement with the side of the same, and a grinding-wheel in contact with the eccentric portions of the saw, in combination with an intermediate gearing for transmitting power from the driving to the grinding wheel, as and for the purpose set forth.

7. In an apparatus for grinding the periphery of circular saws, a saw, a base-board secured in a parallel plane with the same, a table mounted thereon, and an adjusting-rod journaled upon the base-board and having a screw-threaded end tapped into a screw-threaded perforation in the table, in combination with a grinding-wheel adapted to be brought in contact with the periphery of the saw by the revolution of the adjusting-rod, and a wheel in contact with the saw and connected with the grinding-wheel by intermediate gearing, as and for the purpose set forth.

In testimony that I claim the foregoing as my own I hereby affix my signature in presence of two witnesses.

JAMES W. STROUSE.

Witnesses:
ERSKINE H. POTTER,
A. B. STROUSE.